W. H. VIBBER.
SUSPENSION BOX FITTING FOR ELECTRIC INSTALLATION.
APPLICATION FILED APR. 15, 1911.
1,104,395.
Patented July 21, 1914.
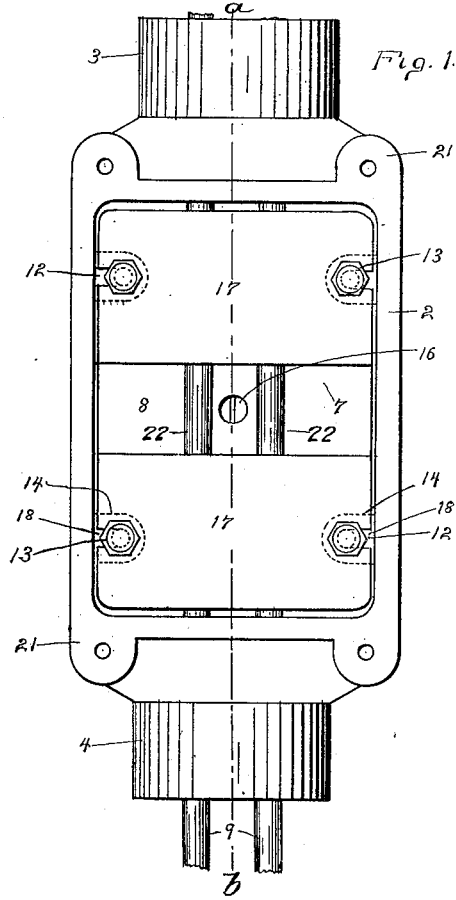
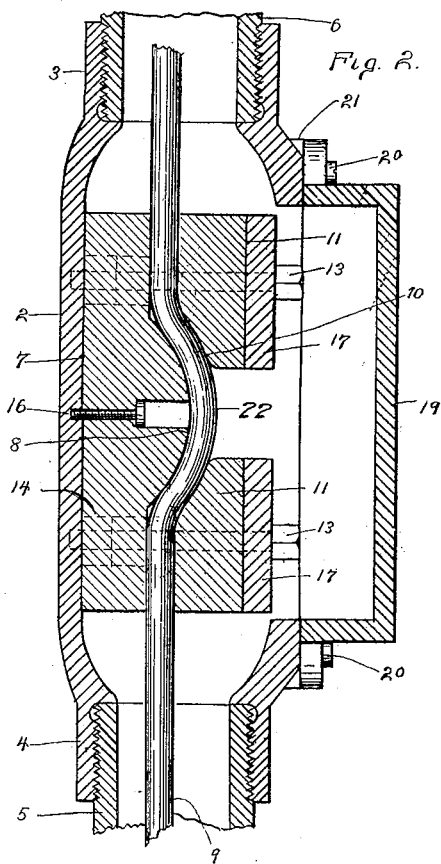
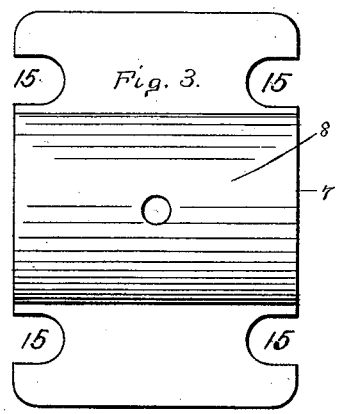
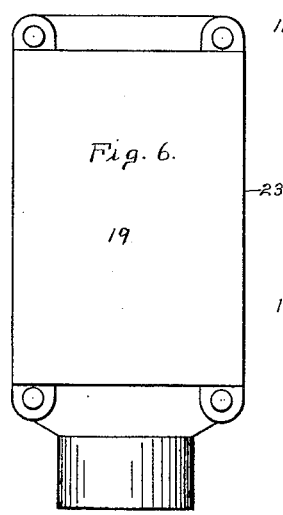
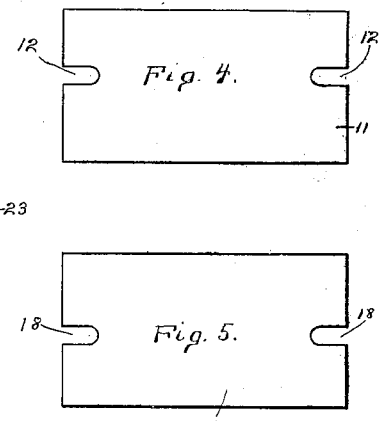

UNITED STATES PATENT OFFICE.

WHEELER H. VIBBER, OF NEW LONDON, CONNECTICUT.

SUSPENSION-BOX FITTING FOR ELECTRIC INSTALLATION.

1,104,395. Specification of Letters Patent. Patented July 21, 1914.

Application filed April 15, 1911. Serial No. 621,357.

*To all whom it may concern:*

Be it known that I, WHEELER H. VIBBER, a citizen of the United States, residing at New London, in the county of New London and State of Connecticut, have invented a new and useful Improvement in Suspension-Box Fittings for Electric Installation; and I do hereby declare the following, when taken in connection with the accompanying drawings and the letters of reference marked thereon, to be a full, clear, and exact description of the same, and which said drawings constitute part of this specification, and represent in—

Figure 1 a view in front elevation of my improved suspension-box fitting with its cover removed. Fig. 2 a broken view in vertical section on the line *a—b* of Fig. 1 with its cover in place. Fig. 3 a detached view in elevation of the deflecting-plate. Fig. 4 a similar view of one of the deflecting-blocks. Fig. 5 a similar view of one of the backing-plates. Fig. 6 a view in front elevation of one of the modified forms which the device may assume.

Heretofore considerable difficulty has been experienced in installing long, vertically arranged lengths of electric wires and cables in high buildings for the reason that their weight falls upon their uppermost terminal connections. It has already been proposed to overcome this difficulty by supporting the wires and cables at intervals throughout their length, but the means thus far suggested for this purpose have either been impractical owing to the difficulty of gripping the wires and cables, or prohibitive on account of their cost.

The object of my present invention is to provide at a low cost, simple, convenient, inexpensive and efficient means for supporting vertically arranged wires and cables in high buildings at such intervals that their weight will be distributed and that all danger of their breaking away or impairing their insulation will be avoided.

With these ends in view, my invention consists in a suspension-box fitting for electric installation, having certain details of construction and combinations of parts as will be hereinafter described and pointed out in the claims.

In carrying out my invention as herein shown, I employ a housing-like oblong suspension-box 2 cast in one piece provided at its upper and lower ends with alined integral internally threaded collars 3 and 4 into which sections 5 and 6 of a vertical conduit pipe are screwed, it being designed to locate the boxes in a vertical conduit pipe at sufficient distances apart so that the length of wire or cable between any two boxes will be easily carried without any undue strain. The boxes as thus arranged constitute a vertical series and virtually form a part of the conduit pipe into which they are injected, as it were, in positions which will vary according to circumstances. Within the said box 2 at the back thereof, I locate a vertically arranged oblong deflecting-plate 7 provided upon its outer face with a central, horizontal rounded deflecting-rib 8 by means of which the wires or cables 9 are forced into a deflecting-space 10 formed between the beveled adjacent edges of two horizontally arranged, removable deflecting-blocks 11 having their respective ends furnished with slots 12 for the reception of clamping bolts 13 the threaded inner ends of which enter bosses 14 cast integral with the back of the box 2 and entering large notches 15 in the edges of the deflecting-plate 7 which is thereby solidly held against endwise movement. Under this construction and arrangement, the blocks 11 are respectively located on opposite sides of the rib 8 which forces the wires or cables into the space 10 formed between the adjacent edges of the blocks. A screw 16 passing through the center of the plate 7, provides for holding it in place with respect to the bosses 14. The deflecting-plate 7 and the deflecting-blocks 11 are preferably made of wood, but may be made of wood fiber or porcelain, or even metal, the material chosen for them being determined by the character of the covering of the wires or cables in conjunction with which the boxes are to be used. In case the blocks 11 are made of porcelain, I shall probably employ in conjunction with them, metal backing-plates 17 corresponding to the blocks in size and formed at their ends with notches 18 for the reception of the clamping-bolts 13. I would have it understood, however, that I do not limit myself to the use of such backing-plates which would not be essential if the blocks 11 were made of wood or wood fiber.

Access to the box 2 is gained through a cover 19 held in place by screws 20 entering lugs 21 at the four corners of the box, which is formed in its outer wall or face with a large opening 2ª closed by the said cover. It will readily be seen that when the cover 19 is removed the wires or cables 9 may be seen and readily inspected in so far as they are exposed between the adjacent edges of the removable deflecting-blocks 11.

My improved one-piece box is adapted in itself to receive the deflecting-plate 7, the deflecting-blocks 11, the backing-plates 17, and the cable or cables 9, all these parts being located entirely within the box proper which constitutes, as it were, a self-contained solid housing in which the cover 19 forms merely a closure for the opening through which the blocks are introduced and inspected. Furthermore, on account of the character of the construction of the box and deflecting-plate and deflecting-blocks, my improved fitting device is adapted to receive one or more cables without any change in the box or plate or blocks. By making the box in one piece it is easy to make it water-tight by simply fitting the cover so as to produce a water-tight joint.

In installing wires or cables in a vertical conduit pipe furnished with my improved suspension-boxes, the deflecting-blocks 11 and cover 19 of each box are removed. Then after the wires or cables are in place, the deflecting-blocks 11 are introduced into the boxes and clamped in place by the bolts 13 which operate to crowd the wires or cables over the rib 8 of the deflecting-plate 7, whereby loops or bends are formed in the wires or cables. The loops or bends thus formed in the wires or cables in great part take the weight of the wires or cables upon themselves and so remove it from the insulating material surrounding them. In other words, the weight of the wires or cables is transferred from their insulating envelops to the said loops or bends, whereby the injury which has heretofore resulted from gripping the wires or cables by their insulating envelops is avoided, since if insulated wires or cables are gripped with sufficient force to support them, their insulation will be ruined. It is not to be understood that friction as a means of supporting the wires or cables is wholly eliminated in my improved clamping device, but it is not depended upon as in the devices of the prior art. As shown, two wires or cables 9 are passed through the box and deflected to form bends 22 by being forced over the rib 8 by the blocks 11.

It is apparent that the upper suspension-box of any such series need have no sleeve at the top, or it may be provided with the sleeve at the top and the same not used. A box 23 having no sleeve at its upper end is shown in Fig. 6.

While my improved box was primarily designed for use as a suspension-box, it might be used to advantage in some situations in which it would not be located in a vertical position. I therefore would have it understood that I do not limit myself to the use of my improved box as a suspension-box.

I claim:—

1. In a suspension-box fitting for electric installation, the combination with a box having a relatively large interior clamping-chamber, provided at its upper and lower ends with means for the attachment of sections of a conduit-pipe, and formed in its outer face with a large lateral opening giving access to the said chamber and normally closed by a cover; of an inner deflecting-member adapted in size to be introduced into the said chamber through the said lateral opening, fastened to the rear wall of the box and adapted in width to have one or more cables passed over its front face, one or more outer deflecting-members adapted to be introduced into the said chamber through the said opening, and means for drawing the said inner and outer deflecting-members together for their co-action, whereby a plurality of cables arranged side by side may be passed through the fitting and gripped therein for being vertically supported.

2. In a suspension-box fitting for electric installation, the combination with a box having a relatively large interior clamping-chamber, provided at its upper and lower ends with means for the attachment of sections of a conduit-pipe, and formed in its outer face with a large lateral opening giving access to the said chamber and normally closed by a cover; of an inner deflecting-member adapted in size to be introduced into and removed from the said chamber through the said lateral opening, and formed with a horizontal deflecting-rib in front of which one or more cables arranged side by side may be passed, two movable deflecting-blocks introduced into and removed from the said chamber through the said lateral opening and respectively located above and below the said horizontal-rib of the inner deflecting-member with which they co-act, and means for drawing the said blocks toward the said inner member, whereby one or more cables passing upward through the box may be gripped and held.

3. In a suspension-box fitting for electric installation, the combination with a box provided at its upper and lower ends with means for the attachment of sections of a conduit-pipe, formed with a relatively large interior clamping-chamber, having in its outer face a large lateral opening giving access to the said chamber and normally closed by a cover, and provided upon the inner face of its rear wall with bosses located at the sides of the said clamping-chamber; of an inner deflecting-member adapted in size to be introduced into the said chamber through the said opening and having a horizontal deflecting-rib, two deflecting-blocks introduced into and removed from the said chamber through the said lateral opening and respectively located above and below the said horizontal-rib and co-acting therewith for gripping a plurality of cables arranged side by side and passing between them, and clamping screws passing through the said blocks, and the inner deflecting-member into the said bosses, whereby a plurality of cables arranged side by side and passing between the said deflecting-member and blocks may be gripped and held.

In testimony whereof, I have signed this specification in the presence of two subscribing witnesses.

WHEELER H. VIBBER.

Witnesses:
A. MacDonald,
Karsten Hansen.